US006932276B1

(12) United States Patent
Liu

(10) Patent No.: US 6,932,276 B1
(45) Date of Patent: Aug. 23, 2005

(54) PEN INTEGRATED WITH A CARD READER

(76) Inventor: Min-Yi Liu, No. 11, Sublane 1, Lane 166, Lung An Street, Taoyuan (TW)

( * ) Notice: Subject to any disclaimer, the term of this patent is extended or adjusted under 35 U.S.C. 154(b) by 0 days.

(21) Appl. No.: 10/766,814

(22) Filed: Jan. 30, 2004

(51) Int. Cl.[7] .............................................. G06K 7/00
(52) U.S. Cl. ...................... 235/486; 401/195; 381/684
(58) Field of Search ............................... 235/382, 486, 235/451, 492; 401/99, 195; 381/684

(56) References Cited

U.S. PATENT DOCUMENTS

| | | | | |
|---|---|---|---|---|
| 6,561,421 | B1 * | 5/2003 | Yu | 235/451 |
| 6,773,192 | B1 * | 8/2004 | Chao | 401/195 |
| 2004/0080989 | A1 * | 4/2004 | Yu | 365/200 |
| 2004/0100748 | A1 * | 5/2004 | Liu et al. | 361/93.1 |
| 2004/0233629 | A1 * | 11/2004 | Wang et al. | 361/684 |

* cited by examiner

*Primary Examiner*—Daniel Stcyr
*Assistant Examiner*—Daniel A. Hess
(74) *Attorney, Agent, or Firm*—Troxell Law Office, PLLC

(57) ABSTRACT

A pen integrated with a card reader is mainly composed of a pen tube and a detachable tube. Inside the detachable tube, there is a connector; through a locking ring, the connector is firmly positioned and attached to inside of the detachable tube; said the pen tube can be separated from the detachable tube for independent use; said the connector has a terminal plug exposable at one end of the detachable tube and a slot inside the detachable tube; there is a slit on the outer surface of the detachable tube to match the slot inside, so an IC card can be inserted through the slit into the slot; at the same time, the exposed terminal plug can connect to a general computer or other main console; thus, the IC card can communicate with a general computer or other main console, and further retrieve or store data.

9 Claims, 11 Drawing Sheets

PEN INTEGRATED WITH A CARD READER

FIELD OF THE INVENTION

The present invention is related to a pen, especially a pen integrated with a card reader.

BACKGROUND OF THE INVENTION

There are many kinds of IC cards for data storage in the present market. For example: SIM card, SD card, MMC card, Memory Stick, Compact Flash card, XD card, PCMCIA card and Smart Media card . . . etc. They all communicate directly with the suitable main console through its internal interface. However, they do not communicate directly with general computers or other main units. Instead, they need an external card reader as a communication interface for retrieving or storing data. Most card readers available in the present market includes single unit or all-in-one unit are bulky and undesirable in portability. Their usability is not satisfactory.

SUMMARY OF THE INVENTION

Given the need of IC card reader, the inventor researched into the convenience of use and brought up a pen set structure integrated with a card reader, so it is portable and easy for use.

The main objective of the present invention is to provide a pen integrated with a card reader. It combines a common pen tube with a detachable tube. Inside the detachable tube, there are different type connector that can accommodate individual kinds of IC cards or a connector for cards for other purposes. The pen can be used for writing and as a portable card reader for IC cards or other cards. The pen has a great value of practical use.

DETAIL DESCRIPTION OF THE INVENTION

Figure 1:
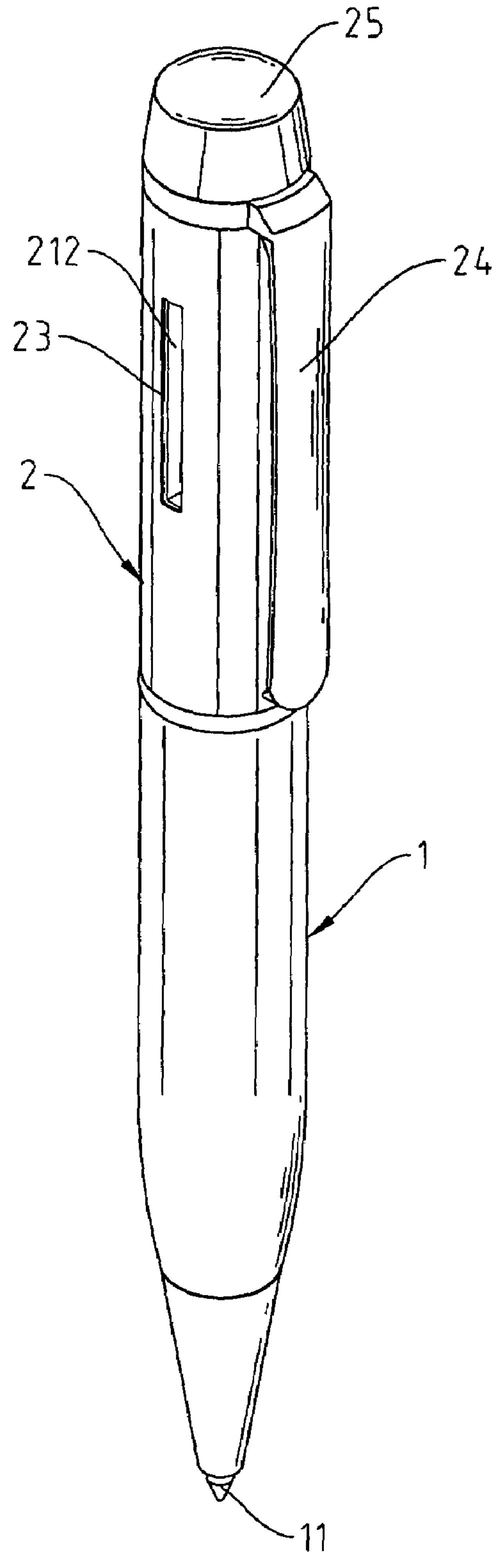
FIG. 1 is an illustration for the appearance of the present invention.

Please refer to the illustrations from FIG. 1 to FIG. 10. The pen integrated with a card reader in the present invention is mainly composed of a pen tube 1 and a detachable tube 2.

The pen tube 1 is for the user to grasp. One end of the pen tube is a pen tip 11, while the other end connects to the detachable tube 2. Inside the detachable tube 2, there is a connector 21. Through a locking ring 22, the connector 21 is firmly positioned and attached to inside of the detachable tube 2. Besides, the peripheral of the locking ring 22 can have a sleeve structure or screw thread to be connected with the pen tube 1 to become an integrated unit (screw thread as locking mechanism shown in the Figure). Such a structure allows the pen tube 1 to be separated from the detachable tube 2. So the two units can work for independently.

As shown from FIG. 3 to FIG. 6, the above-mentioned connector 21 has a terminal plug 211 (exposable at the bottom end or the top end of the detachable tube 2) at one end of the detachable tube 2. The terminal plug 211 is a standard USB plug or a 1394 firewire plug. Therefore, the detachable tube 2 can connect to a general computer or other main console as interface for communication.

Figure 7:
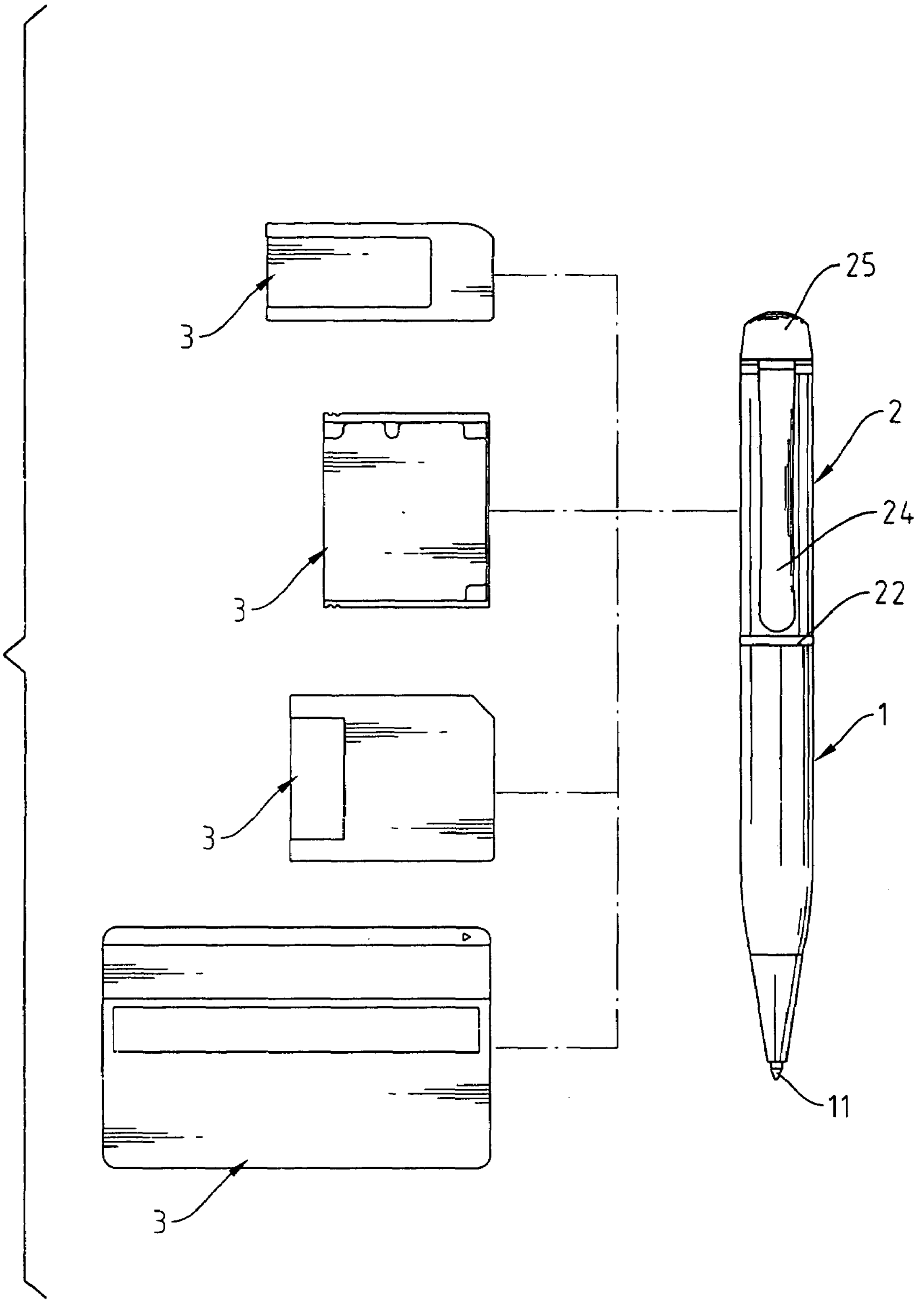
FIG. 7 is an illustration of accommodation of all kinds of IC cards for the device in the present invention.
Figure 8:
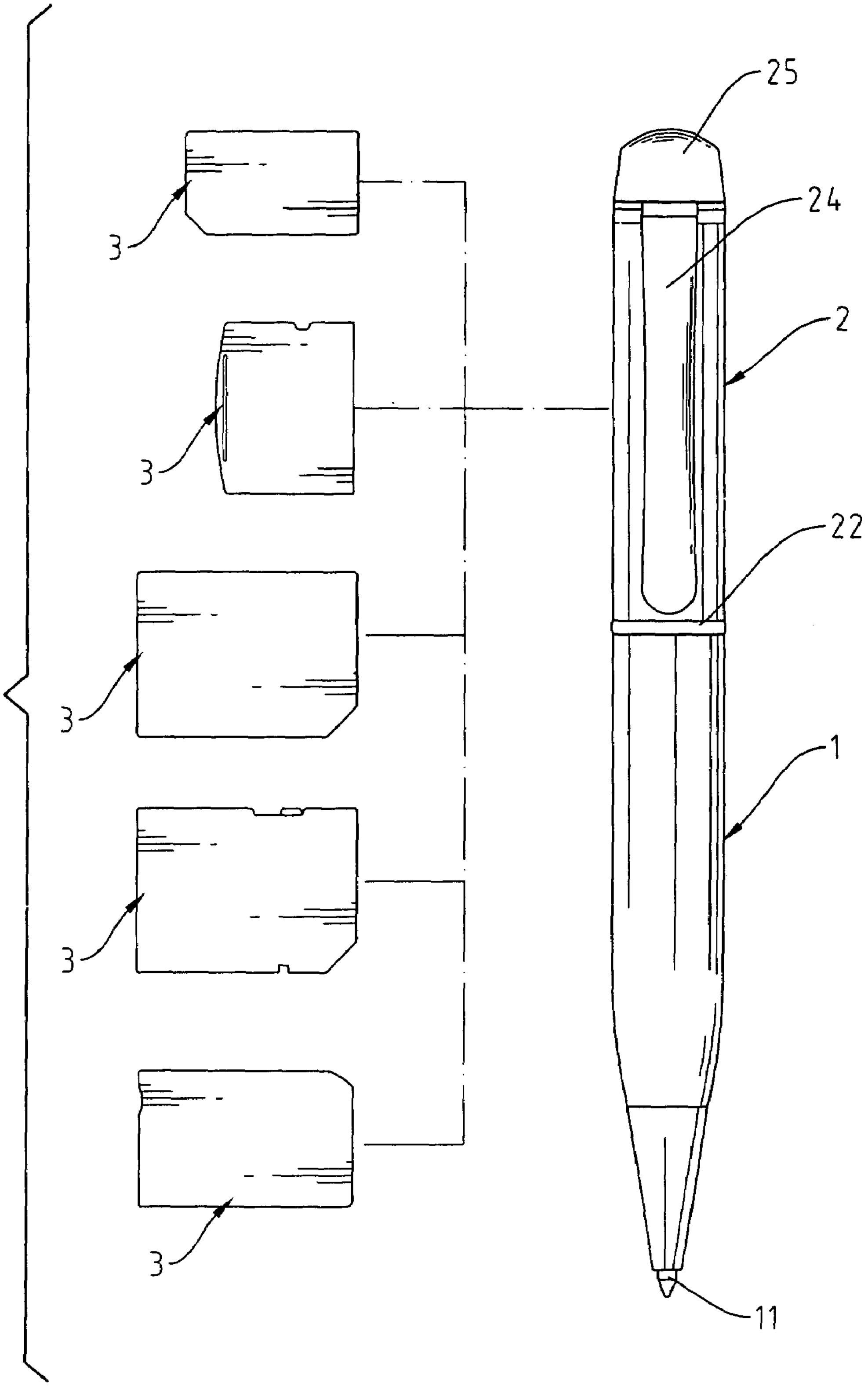
FIG. 8 is another illustration of accommodation of all kinds of IC cards for the device in the present invention.

Further, the connector 21 has a slot 212 to accommodate all kinds of IC cards 3, like SIM card, SD card, MMC card, Memory Stick, Compact Flash card, XD card, PCMCIA card and Smart Media . . . etc (as shown in FIG. 7 and FIG. 8) or for cards of other purposes. The specification for the slot 212 is designed according to the card type. So the card can be placed into the slot to constitute a communication interface.

Figure 2:
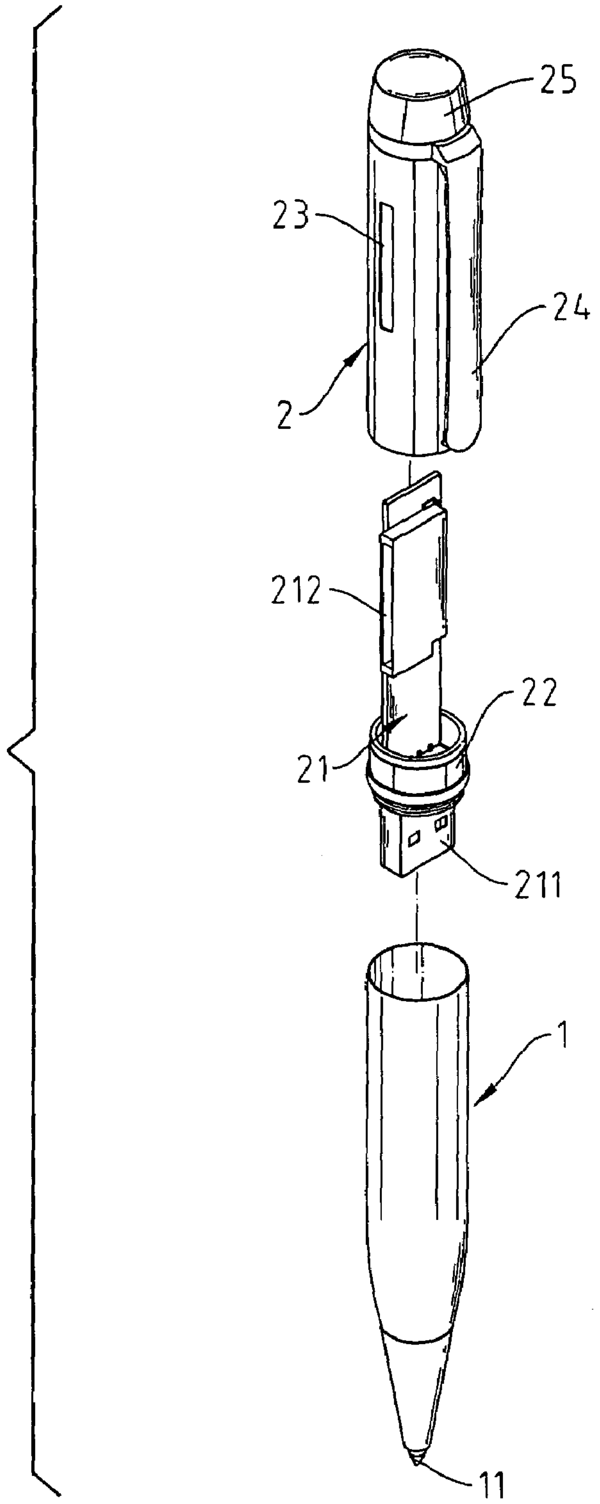
FIG. 2 is a decomposition diagram for the components in the present invention.
Figure 3:
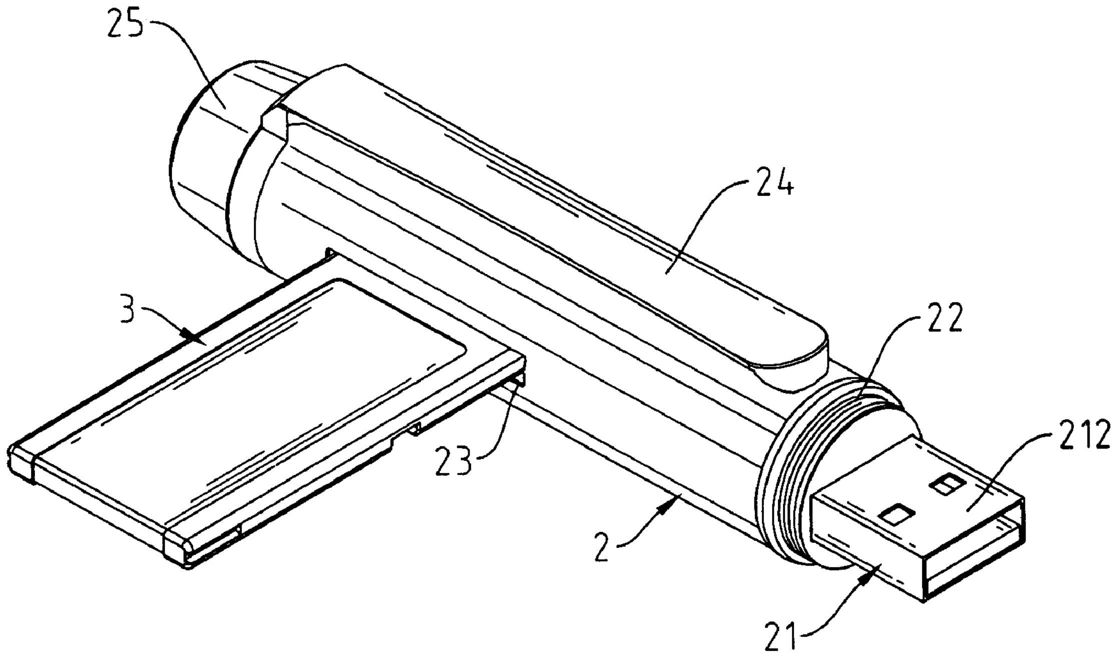
FIG. 3 is an example of assembly of the detachable tube to form a communication interface in the present invention.
Figure 9:
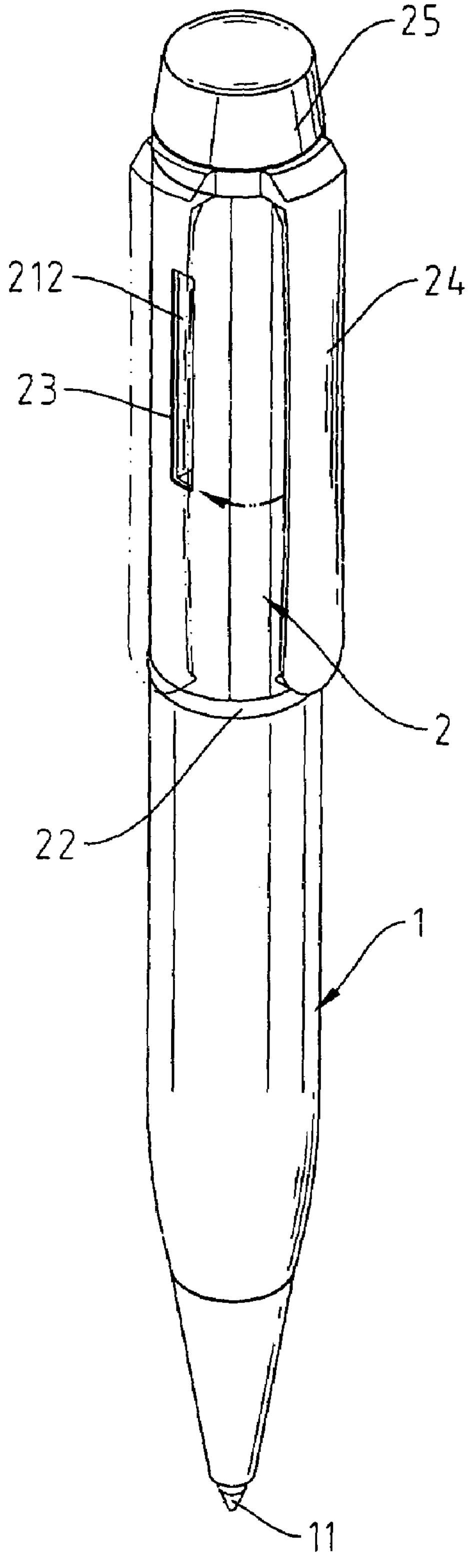
FIG. 9 is an illustration of sealing the slot by the clip on the detachable tube in the present invention.

Please refer to FIG. 1 and FIG. 2. On the outer surface detachable tube 2, there is a slit 23 to match the slot 212, so IC card 3 can be inserted through the slit 23 into the slot 212. Further, on the outer surface of the detachable tube 2, there is a clip 24 that is positioned against a cap 25 on the top of the detachable tube 2, so the clip 24 is secured and turnable without dropping off. As shown in FIG. 9, when there is no IC card 3 inserted in the detachable tube 2, the pen clip 24 can turn to seal the slot 212, so the pen looks just like a normal writing pen.

Figure 4:
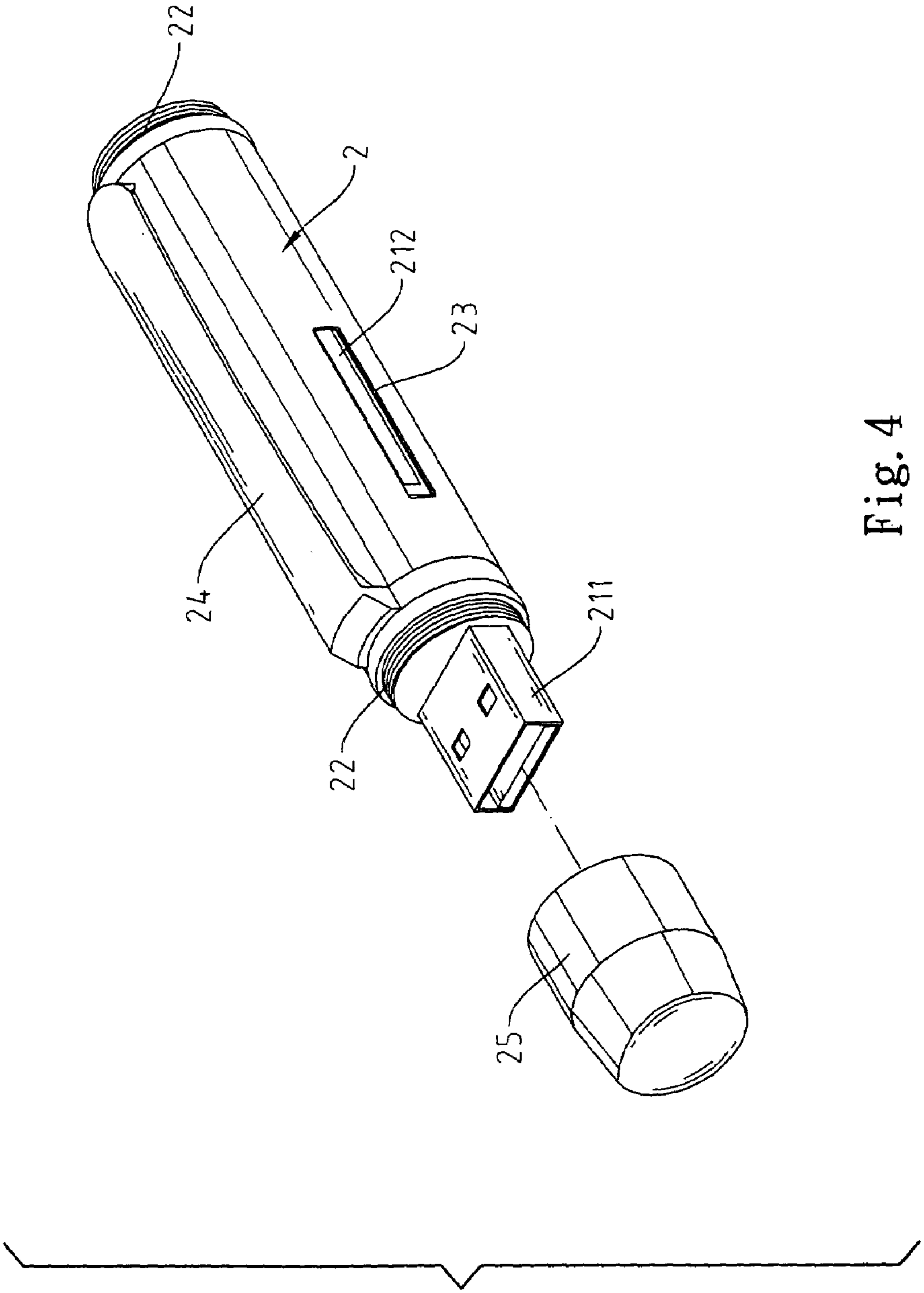
FIG. 4 is an illustration of USB plug on the top of the detachable tube in the present invention.
Figure 5:
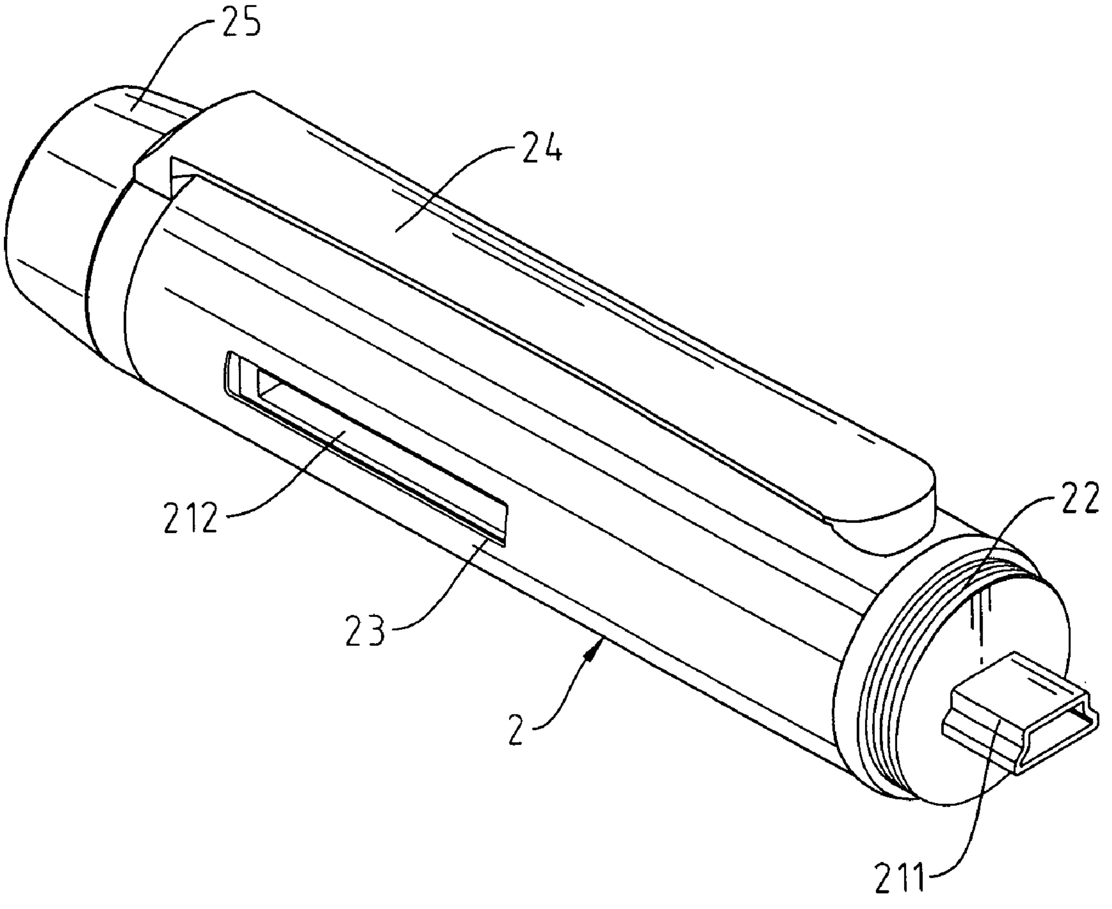
FIG. 5 is an illustration of 1394 firewire plug on the bottom of the detachable tube in the present invention.
Figure 6:
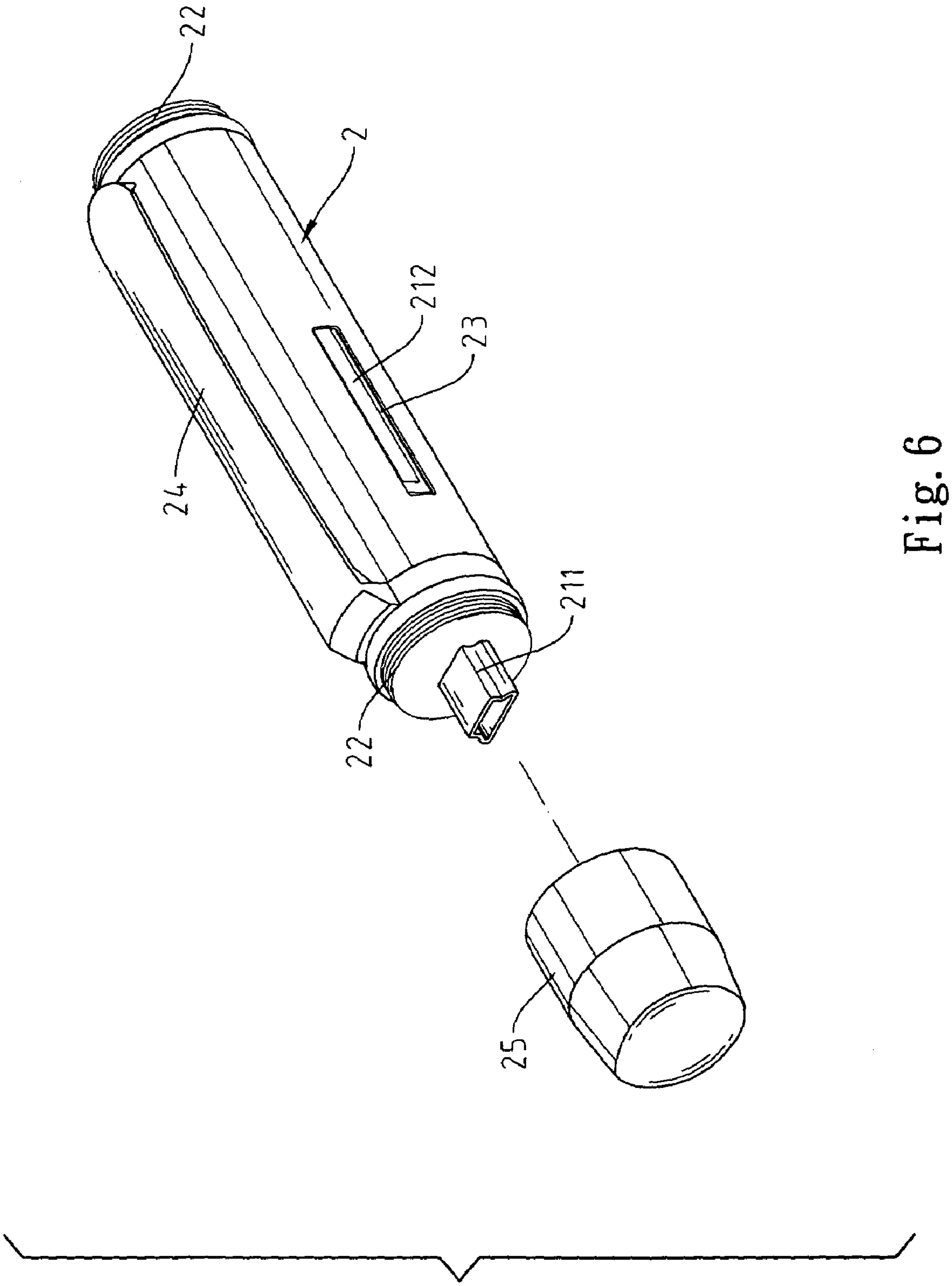
FIG. 6 is an illustration of 1394 firewire plug on the top of the detachable tube in the present invention.
Figure 10:
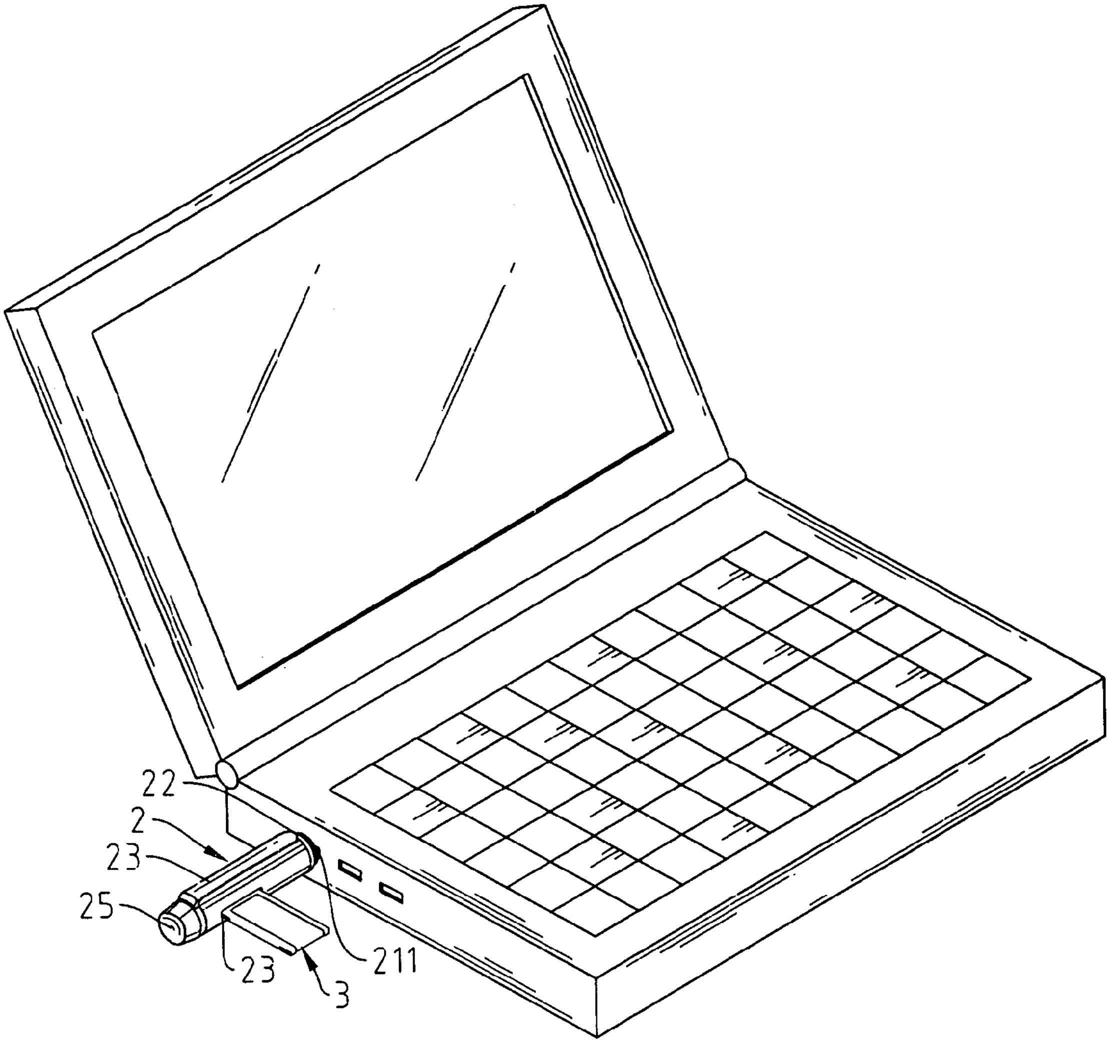
FIG. 10 is an example of the present invention that the detachable tube connects to a main console as an interface for communication.

It is known from the above description that the present invention provides a device that is a pen integrated with a card reader. When the device is in a practical use, it is a portable writing pen. But when the device is used as a reader for IC cards 3 or other cards, the detachable tube 2 can be separated from the pen tube 1, so the terminal plug 211 becomes available for use. If the terminal plug 2 is arranged on the top of the detachable tube 2 as shown in FIG. 4 and FIG. 6, it becomes available for use after the cap 25 is open. In the meantime, the clip 24 turns to unseal the slot 212, so IC card 3 can be inserted into the slot 212. In this way, the terminal plug 211 at the other end of the detachable tube 2 can connect to a general computer or other main console, as shown in FIG. 10. Thus, the IC card 3 can communicate with a general computer or other main console, and further retrieve or store data.

Furthermore, the cards mentioned above for other purposes could be a wireless data transmission device. They can be made like IC cards 3, small, short and thin, so they can be compatible with the connector 21 in the detachable tube 2. Particularly, when the terminal plug 211 connects to a general computer or other main console, the device is used as an interface for wireless communication.

Figure 11:
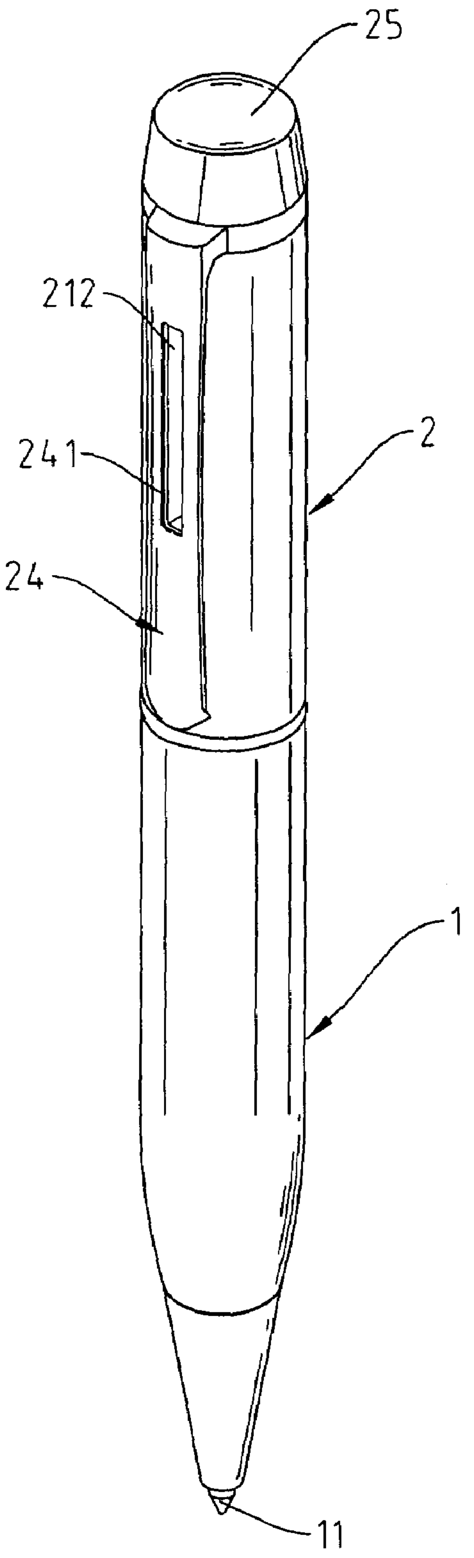
FIG. 11 is an illustration for another embodiment for the present invention.

Furthermore, the present invention can also be used as the pen in FIG. 11, where on the stationary pen clip 24 there is a slit 241 to match the slot 212, so IC cards 3 or cards for other purposes can be placed through the slit 241 into the slot 212. In the meantime, if the cap is open 25, the terminal plug 211 becomes available to connect to a general computer or other main console. Thus, the IC card 3 can communicate with a general computer or other main console, and further retrieve or store data.

The above is description of practical application of the present invention, the example is not to limit the scope of use of the invention. Those equivalent applications or modifications to the present invention should not be excluded from the scope of the present invention.

What is claimed is:

1. A pen for use with an IC card comprising:

a) a pen tube with a pen tip;

b) a detachable tube having:

i) a slit located through a peripheral wall;

ii) a clip rotatably attached to a first end thereof and selectively covering the slit; and iii) a cap removably connected to the first end of the detachable tube; and c) a connector located between and connecting the pen tube and the detachable tube, the connector having:

i) a terminal plug; and ii) a card insert slot aligning with the slit of the detachable tube, wherein the IC card is removably inserted through the slit and into the cart insert slot.

2. The pen according to claim 1, wherein the terminal plug is one of a USB plug and a 1394 firewire plug.

3. The pen according to claim 1, wherein the IC Card is selected from a group of IC cards consisting of a SIM card, a SD card, a MMC card, a memory stick, a compact flash card, an XD card, a PCMCIA card, and a Smart Media card.

4. The pen according to claim 1, wherein the terminal plug is located on a top of the connector.

5. The pen according to claim 1, wherein the terminal plug is located on a bottom of the connector.

6. The pen according to claim 1, wherein the IC card is a wireless data transmission device.

7. The pen according to claim 1, wherein the connector includes a locking ring located on an outer periphery thereof, the locking ring is located between the pen tube and the detachable tube.

8. The pen according to claim 1, wherein the cap is threadedly connected to the first end of the detachable tube.

9. The pen according to claim 1, wherein the connector is threadedly connected to the first end of the pen tube.

* * * * *